United States Patent
Madden et al.

(10) Patent No.: US 6,297,825 B1
(45) Date of Patent: Oct. 2, 2001

(54) TEMPORAL SMOOTHING OF SCENE ANALYSIS DATA FOR IMAGE SEQUENCE GENERATION

(75) Inventors: Paul B. Madden, Acton; Wesley K. Cobb, Attleboro; Jean-Pierre Schott, Weston; David Askey, Carlisle, all of MA (US); Kenneth J. Eyring, Centerport, NY (US)

(73) Assignee: SynaPix, Inc., Lowell, MA (US)

( * ) Notice: Subject to any disclaimer, the term of this patent is extended or adjusted under 35 U.S.C. 154(b) by 0 days.

(21) Appl. No.: 09/055,843

(22) Filed: Apr. 6, 1998

(51) Int. Cl.[7] .................................................. G06T 15/00
(52) U.S. Cl. ............................................ 345/419; 345/432
(58) Field of Search .................................... 345/418, 419, 345/420, 426, 431, 432

(56) References Cited

U.S. PATENT DOCUMENTS

| | | | |
|---|---|---|---|
| 3,947,833 | 3/1976 | Eckstein, Jr. | 340/258 R |
| 3,970,841 | 7/1976 | Green | 250/201 |
| 4,175,860 | 11/1979 | Bacus | 356/39 |
| 4,385,322 | 5/1983 | Hubach et al. | 358/221 |
| 4,620,318 | 10/1986 | Hill | 382/2 |
| 4,639,768 | 1/1987 | Ueno et al. | 358/22 |
| 4,646,229 | 2/1987 | Boyle | 364/200 |
| 4,661,986 | 4/1987 | Adelson | 382/41 |
| 4,667,221 | 5/1987 | Cawley et al. | 358/22 |
| 4,682,300 | 7/1987 | Seto et al. | 364/571 |
| 4,685,146 | 8/1987 | Fenster et al. | 382/54 |
| 4,692,806 | 9/1987 | Anderson et al. | 358/209 |
| 4,703,514 | 10/1987 | van der Wal | 382/41 |
| 4,706,296 | 11/1987 | Pedotti et al. | 382/42 |
| 4,835,532 | 5/1989 | Fant | 340/728 |
| 4,847,688 | 7/1989 | Nishimura et al. | 358/125 |
| 4,849,746 | 7/1989 | Dubner | 340/728 |
| 4,858,000 | 8/1989 | Lu | 358/84 |
| 4,864,394 | 9/1989 | Gillard | 358/105 |
| 4,870,692 | 9/1989 | Zuiderveld et al. | 382/6 |
| 5,058,042 | 10/1991 | Hanna et al. | 364/522 |

(List continued on next page.)

FOREIGN PATENT DOCUMENTS

| | | |
|---|---|---|
| 93/21636 | 10/1993 | (WO) . |
| 96/31979 | 10/1996 | (WO) . |

OTHER PUBLICATIONS

Baker, H.H., "Surface Reconstruction from Image Sequences," Proceeding of the International Conference on Computer Vision, Tampa, Florida, pp. 334–343 (Dec. 5–8, 1988).

(List continued on next page.)

Primary Examiner—Cliff N. Vo
(74) Attorney, Agent, or Firm—Hamilton, Brook, Smith & Reynolds, P.C.

(57) ABSTRACT

A technique for temporal smoothing of results from a scene analysis process which creates a sequence of visually pleasing and acceptable images generated in whole or part from such results. The technique applies temporal smoothing across time-related sets of scene analysis results. The spatial smoothing can be applied at various steps in the process: to images in the original sequence, to intermediate or final results of scene analysis in either a pixel-oriented or geometric domain, or to the images generated in whole or part from the scene analysis results. In a preferred embodiment, different levels of smoothing are applied to different parts of the intermediate or final results. The differentiation can be done using image masks (for pixel-oriented results) or geometry selection techniques (for geometric results). This allows a higher level of smoothing in certain areas where the generated visual images will benefit from such additional smoothing, while avoiding over-smoothing in other areas where the smoothing would obscure critical details within the generated images.

19 Claims, 8 Drawing Sheets

U.S. PATENT DOCUMENTS

| | | | |
|---|---|---|---|
| 5,063,603 | 11/1991 | Burt | 382/37 |
| 5,067,014 | 11/1991 | Bergen et al. | 358/105 |
| 5,133,070 | 7/1992 | Barker et al. | 395/650 |
| 5,134,473 | 7/1992 | Nagura | 358/109 |
| 5,140,416 | 8/1992 | Tinkler | 358/88 |
| 5,210,799 | 5/1993 | Rao | 382/22 |
| 5,212,544 | 5/1993 | Kellar et al. | 358/22 |
| 5,259,040 | 11/1993 | Hanna | 382/41 |
| 5,260,791 | 11/1993 | Lubin | 358/160 |
| 5,270,756 | 12/1993 | Busenburg | 358/109 |
| 5,296,926 | 3/1994 | Nagura | 348/144 |
| 5,325,449 | 6/1994 | Burt et al. | 382/56 |
| 5,355,450 | 10/1994 | Garmon et al. | 395/162 |
| 5,414,806 | 5/1995 | Richards | 395/135 |
| 5,455,775 | 10/1995 | Huber et al. | 364/488 |
| 5,473,364 | 12/1995 | Burt | 348/47 |
| 5,488,674 | 1/1996 | Burt et al. | 382/284 |
| 5,511,153 | 4/1996 | Azarbayejani et al. | 395/119 |
| 5,577,190 | 11/1996 | Peters | 395/501 |
| 5,588,104 | 12/1996 | Lanier et al. | 395/326 |
| 5,588,139 | 12/1996 | Lanier et al. | 395/500 |
| 5,596,687 | 1/1997 | Peters, Jr. | 395/130 |
| 5,619,628 | 4/1997 | Fujita et al. | 395/127 |

OTHER PUBLICATIONS

Poelman, C.J., "The Paraperspective and Projective Factorization Methods for Recovering Shape and Motion," *Carnegie Mellon School of Computer Science*, (Jul. 1995).

Becker, S., et al., "Semiautomatic 3–D Model Extraction From Uncalibrated 2–D Camera Views," MIT Media Laboratory.

Sawhney, H.S., "3D Geometry From Planar Parallax," Machine Vision Group—IBM Almaden Research Center, (1994).

Ballard, D.H., et al., "An Approach to Knowledge–Directed Image Analysis," *Computer Vision Systems,* (1978).

Burt, P.J. et al., "The Laplacian Pyramid as a Compact Image Code," *IEEE Transactions on Communications,* COM–31 (4) :532–540, (Apr. 1983).

Williams, T.W. et al., "Model–Building in The Visions System," Massachusetts Institute of Technology 5th International Joint Conference on Artificial Intelligence, 2:644–645, (Aug. 1977).

Jancene, P. et al., "RES: Computing the Interactions Between Real and Virtual Objects in Video Sequences.".

Rohrer, R., "Automated Construction of Virtual Worlds Using Modeling Constraints," *The George Washington University —Progess Report,* (Jan. 1994).

Debevec, P.E., et al. "Modeling and Rendering Architecture from Photographs: A Hybrid Geometry–and Image–Based Approach," Computer Graphics Proceedings, Annual Conference Series, 11–20, (1996).

Debevec, P.E., et al. "Recovering High Dynamic Range Radiance Maps from Photographs," Computer Graphics Proceedings, Annual Conference Series, 369–378, (1997).

Alzarbayejani, A., et al. "Recursive Estimation of Motion, Structure, and Focal Length," *IEEE Transactions on Pattern Analysis and Machine Intelligence,* 17(6) :562–575, (Jun. 1995).

Berthold, K.P.H., et al. "Determining Optical Flow," *Artificial Intelligence,* 17:185–203, (1981).

Brooks, R.A., et al. "Geometric Modeling in Vision for Manufacturing," *SPIE,* 281:141–159, (1981).

Fua, P., "Model–Based Optimization: An Approach to Fast, Accurate, and Consistent Site Modeling from Imagery," Artificial Intelligence Center—SRI International.

Fua, P., et al. "Using 3–Dimensional Meshes to Combine Image–Based and Geometry–Based Constraints," SRI International.

Tomasi, C., et al., "Shape and Motion from Image Streams: a Factorization Method —Planar Motions," Carnegie Mellon School of Computer Science, (Sep. 1990).

Tomasi, C., et al., "Shape and Motion from Image Streams: a Factorization Method —Point Features in 3D Motion," Carnegie Mellon School of Computer Science, (Jan. 1991).

Tomasi, C., "Shape and Motion from Image Streams: a Factorization Method," Carnegie Mellon School of Computer Science, (Sep. 1991).

Little, T.D.C., et al., "Interval–Based Conceptual Models for Time–Dependent Multimedia Data," Boston University Multimedia Communications Laboratory and Purdue University School of Electrical Engineering Multimedia Communications Lab, (May 1993).

Schechter, G., et al., "Functional 3D Graphics in C++—with an Object–Oriented, Multiple Dispatching Implementation," Eurographics Object–Oriented Graphics Workshop, (1994).

Elliott, C., "The Essence of ActiveX Animation," Microsoft Research, (Feb. 1997).

Elliott, C., "A Brief Introduction to Active VRML," *Microsoft Research Technical Report,* (Feb. 1996).

Maestri, G., "Parametric, Object–Oriented Modeling and Animation with Houdini," pp. 48–50, *Digital Magic,* (Aug. 1997).

Drazovich, R.J., et al., "Radar Target Classification," pp. 496–501, IEEE, (Aug. 1981).

Levine, M.D. et al., "A Knowledge–Based Computer Vision System," pp. 335–352, *Computer Vision Systems,* (1978).

State, A. et al., "Superior Augmented Reality Registration by Integrating Landmark and Magnetic Tracking," pp. 429–438, Computer Graphics Proceedings, Annual Conference Series, (1996).

"Middlesex Virtual Set System," *Product Brochure,* (1997).

"Cyberset O Highland Virtual Set," *Product Orad High–Tec Systems,* (1997).

"Virtual Replay Sports Analysis Tool," *Product Brochure,* (1997).

"Jaleo Digital Post Production System," *Product Brochure,* (1997).

"Flint and Flint RT," *Product Brochure,* (Mar. 1997).

"Warner Digital Creates Glacial Gales," *American Cinematographer,* pp. 38–39, (Jul. 1997).

"Digiscore Saves the Day," *Product Flyer,* (1996).

"Inferno," http://www.discreet.com, (1997).

"Flame," Product Description, http://www.discreet.com, (1997).

"Composer V4," Alias Wave Front Product Description, (1995).

"Power Animator," *Alias/Wavefront Product Brochure,* (1996).

"SoftImage 3D 3.51 for Windows," Product Review, (1995).

"3D Studio Max," Product Review, (1997).

"Animation Master," Product Demonstration, (1997).

Clarkson, M., "3D Animation Tools for Less Than $1,500," *PC Graphics and Video,* pp. 52–56, (Aug. 1996).

Hamlin, J.S., "Autodessys' 3D Modeler FormZ Renderzone 2.8," *PC Graphics and Video,* pp. 58–62, (Aug. 1996).

Street, R., "3–D Software for the Newcomer," *A V Video*, pp. 62–67, (Jul. 1996).

Sowizral, H., et al., "Java 3D API Specification," (Aug. 1997).

Tenenbaum, J.M., et al., "IGS: A Paradigm for Integrating Image Segmentation and Interpretation," *Artificial Intelligence Center—Stanford Research Institute*, pp. 504–513.

Binford, T.O., et al., "Image Understanding Via Geometric Models," pp. 364–369, IEEE, (1980).

Price, K.E., et al., "Symbolic Matching of Images and Scene Models," pp. 105–112, IEEE, (1982).

Amini, A.A., et al., "Representation and Organization of Domain Knowledge in a Blackboard Architecture: A Case Study from Computer Vision," pp. 884–889, IEEE, (1987).

Feldman, J.A., et al., "Decision Theory and Artificial Intelligence—A Semantics–Based Region Analyzer," *Artificial Intelligence, 5:349–371*, (1974).

Barrow, H.G., et al., "Representation and Use of Knowledge in Vision," Stanford Research Institute.

Nevatia, R., et al., "Description and Recognition of Curved Objects," *Artificial Intelligence*, 8:77–98, (1977).

Parma, C.C., et al., "Experiments in Schema–Driven Interpretation of a Natural Scene," pp. 237–245, IEEE (1980).

Hanson, A.R., et al., "Constructing Semantic Models in the Visual Analysis of Scenes," The *Milwaukee Symposium on Automatic Computation and Control*, pp. 97–102.

Shaheen, S.I., et al., "Some Experiments with the Interpretation Strategy of a Modular Computer Vision System," *Pattern Recognition*, 14(1–6): 87–100, (1981).

Levine, M.D., et al., "A Modular Computer Vision System for Picture Segmentation and Interpretation," *IEEE Transactions on Pattern Analysis and Machine Intelligence*, PAMI-3(5) :540–556, (Sep. 1981).

Levine, M.D., et al., "A Modular Computer Vision System for Picture Segmentation and Interpretation," pp. 522–539, IEEE, (1979).

"Nonlinear Video Reigns at NAB," *NewMedia*, pp. 21–29, (Jun. 1996).

Beale, S., "Media Components Come Together," www.macworld.com, pp. 56–57, (Nov. 1996).

Gagalowicz, A., "Collaboration Between Computer Graphics and Computer Vision," Proceedings of the Third International Conference on Computer Vision, Osaka, Japan, pp. 733–737 (Dec. 4–7, 1990).

Menon, J., "Collaborative Visualization and Modeling," Proceedings of the 1997 International Conference on Shape Modeling and Applications, Aizu–Wakamatsu, Japan, pp. 178–187 (Mar. 3–6, 1997).

Lee et al, "Polymorph: Morphing Among Multiple Images", IEEE, pp. 60–65, Feb. 1988.*

* cited by examiner

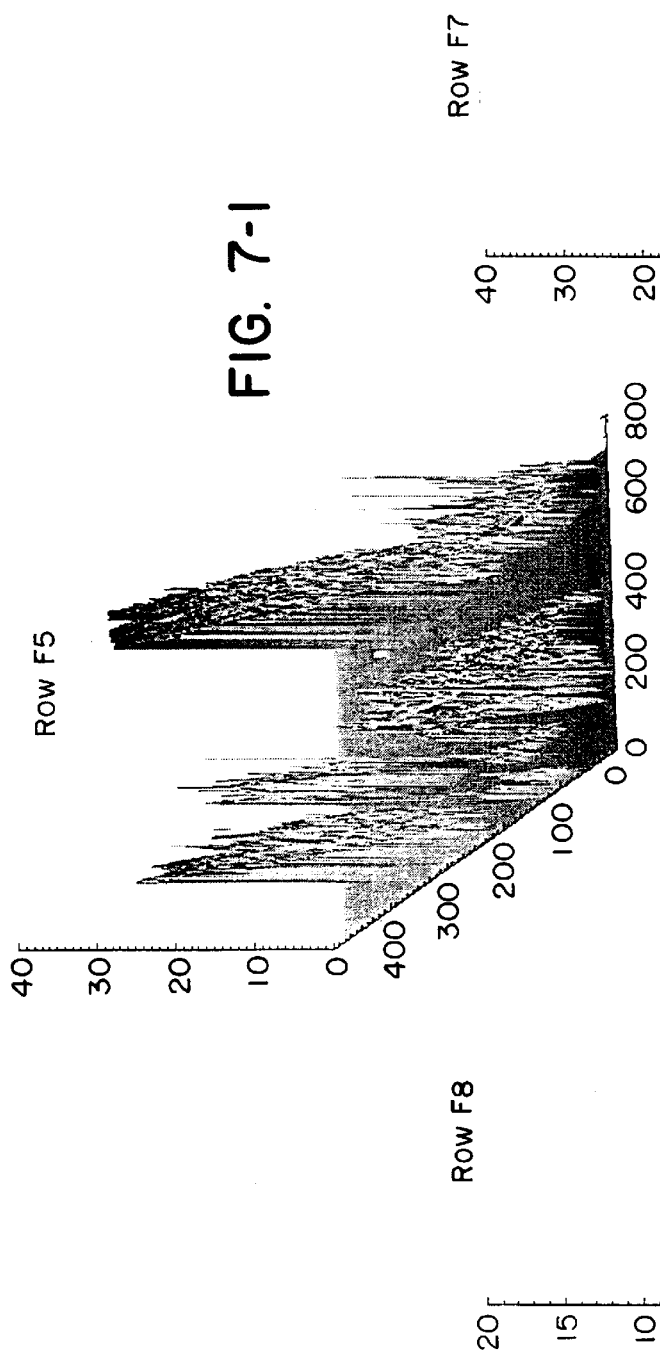
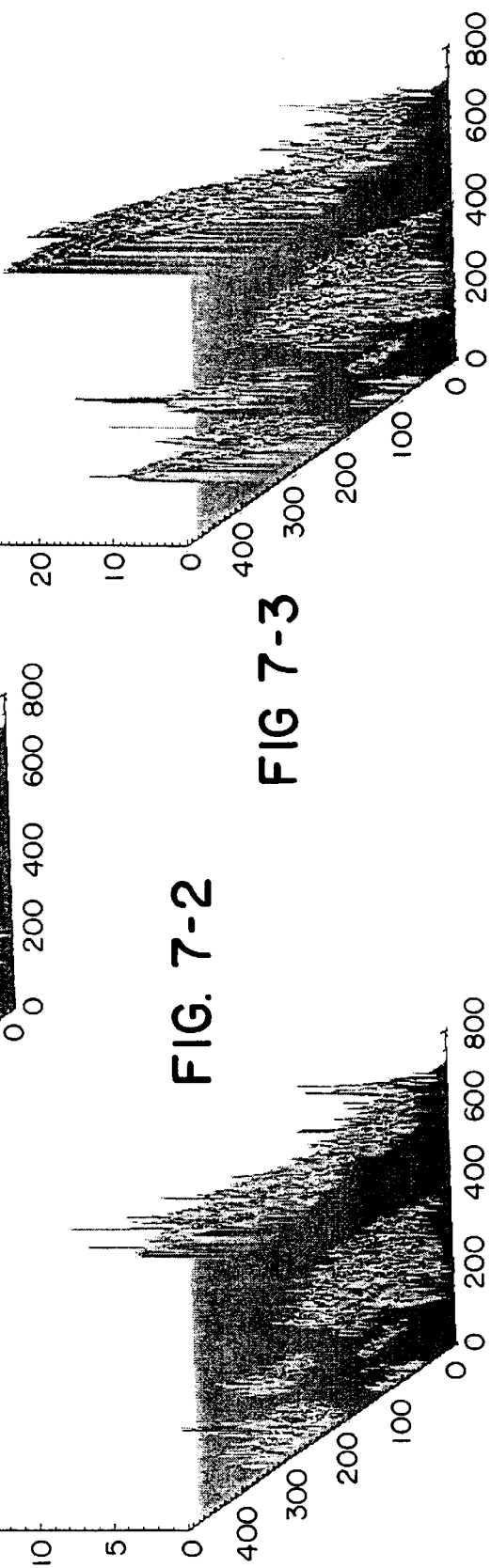
FIG. 7-1
FIG. 7-2
FIG 7-3

TEMPORAL SMOOTHING OF SCENE ANALYSIS DATA FOR IMAGE SEQUENCE GENERATION

BACKGROUND

Scene analysis is the process of using computer-based systems to derive estimated information about a visual scene from a series of images of that same visual scene. One application of these techniques is in media production—the process of creating media content for use in films, videos, broadcast television, television commercials, interactive games, CD-ROM titles, DVD titles, Internet or intranet web sites, and related or derived formats. These techniques can be applied in the pre-production, production and post-production phases of the overall media production process. Other design visualization application areas include industrial design and architecture. Scene analysis is also applied in areas such as surveillance, reconnaissance, medicine, and the creation of simulation environments for entertainment, training, education, and marketing.

By recovering the estimated scene structure, it is possible to treat the elements of a visual scene as abstract three-dimensional geometric and/or volumetric objects that can be processed, manipulated and combined with other data objects. There are multiple techniques to estimate the parameters of a visual scene from a series of two-dimensional images of that scene. Various aspects of the visual scene, including both two-dimensional and three-dimensional information, can be estimated using techniques such as:

- estimating extrinsic camera parameters (such as camera path and camera orientation);
- estimating intrinsic camera parameters (such as focal length and optical center);
- estimating depths in the scene for pixels in the images (depth maps);
- estimating geometry and/or materials properties of objects and their surfaces in the scene (estimating scene structure);
- estimating areas of motion in the scene (motion detection); and
- estimating paths of feature points and/or objects in the scene (2D and 3D feature tracking).

Underlying these techniques are algorithms that can be categorized into a few general classes. Methods based on dense optical flow attempt to recover the optical flow vectors across pairs of images, typically on a per-pixel basis. Methods based on feature tracking typically select visual features in one image (based on criteria such as areas of high contrast) and attempt to track the path of each selected feature across a series of related images. Most feature tracking methods track a relatively sparse array of features, ranging from a single feature to a few hundred.

For example, Horn, B. K. P. and Schunck, B. G., in "Determining Optical Flow," Artificial Intelligence, Vol. 17, pp. 185–203 (1981) describe how so-called optical flow techniques may be used to detect velocities of brightness patterns in an image stream to segment the image frames into pixel regions corresponding to particular visual objects.

Becker, S. and Bove, V. M., in "Semiautomatic 3D Model Extraction from Uncalibrated 2-D Camera Views," Proceedings SPIE Visual Data Exploration and Analysis II, vol. 2410, pp. 447–461 (1995) describe a technique for extracting a three-dimensional (3-D) scene model from two-dimensional (2-D) pixel-based image representations as a set of 3-D mathematical abstract representations of visual objects in the scene as well as camera parameters and depth maps.

Sawhney, H. S., in "3D Geometry from Planar Parallax", IEEE 1063-6919/94 (1994), pp. 929–934 discusses a technique for deriving 3-D structure through perspective projection using motion parallax defined with respect to an arbitrary dominant plane.

Poelman, C. J. et al in "A Paraperspective Factorization Method for Shape and Motion Recovery", Dec. 11, 1993, Carnegie Mellon University Report (MU-CS-93-219), elaborates on a factorization method for recovery both the shape of an object and its motion from a sequence of images, using many images and tracking many feature points.

A new method, the dense feature array method, tracks a dense array of features across a series of images. The dense feature array method can track feature densities up to a per-pixel level, and is described in a co-pending United States patent application by Moorby, P. R., entitled "Feature Tracking Using a Dense Feature Array", serial number 09/054,866 filed on Apr. 3, 1998 and assigned to SynaPix, Inc., the assignee of the present application.

However, a key barrier to widespread adoption of these techniques is the inherent uncertainty and inaccuracy of any estimation technique. The information encoded in the images about the actual elements in the visual scene and their relationships is incomplete, and typically distorted by artifacts of the imaging process. As a result, the utility of automated scene analysis drops dramatically as the estimates become unreliable and unpredictable wherever the information encoded in the images is noisy, incomplete or simply missing.

For example, inter-object occlusions, shadows, specular highlights and imaging artifacts such as noise and distortion can all interact in the pixel values of the images. When some or all of these factors are introduced, the probability increases that the scene analysis process will produce results that are not meaningful, unstable or inaccurate for some areas of the scene.

An error in a single result is often propagated within the analysis process. Errors are propagated when results for local regions of the image are correlated, interpolated or used in fitting global parameters of the scene. For example, parallax methods of deriving depths of objects in the scene perform a global fit of scene parameters based on a set of local parameters computed across the images being matched.

Other examples of potential error propagation can be found in feature tracking algorithms such as described in Tomasi, C., et al., "Shape and Motion from Image Streams: a Factorization Method", Technical Report CMU-CS-91-172, Carnegie Mellon University (1991), or in a scene structure recovery method based on feature tracking as in the above-referenced Poelman publication. In these types of scene analysis methods, errors are propagated when a match between local features is used to either estimate or constrain matches in neighboring local regions, or estimate or constrain matches across images.

For certain applications, the time-based sequence of input images is analyzed in order to develop a continuous sequence of interpreted images as an output result. Depending on the technique in use, these results can be visually interpreted and presented as pixel values in images associated with the original source images, or as geometric objects (such as sets of points, curves or meshes) related to the original source images.

When such visually interpreted results are themselves presented in a temporal sequence of images generated in whole or part from such results, the errors and artifacts in the results appear as anomalies in the generated images. Since the errors and uncertainties in the results can change and shift in the visual sequence, the visual anomalies in the generated images will appear to occur in either random patterns ("dancing" around in the image sequence) or discernible patterns ("rolling" through the image sequence). These visual anomalies can be confusing, visually displeasing, distracting and/or annoying to the viewer.

In some applications, such as military intelligence systems, the trained professionals using such systems are expected to tolerate some level of visual anomalies. However, in design visualization applications, the eventual viewer of the images generated from the interpreted results is expected to have a relatively low tolerance for visual anomalies.

For example, in the production (including the post-production phase) of media content, every effort must be made to avoid, correct or otherwise rectify such visual anomalies. The same is true in most design visualization systems. If such visual anomalies are difficult to filter or smooth automatically (both within each generated image and across a temporal sequence of such generated images), painstaking labor-intensive adjustments are required in order to achieve acceptable quality.

Consider also that the producer of multimedia content typically wishes to use one or more scene models in the first place to create as accurate a representation of the scene as possible. For example, consider a motion picture environment where computer-generated special effects are to appear in a scene with real world objects and actors. The content creator may choose to start by creating models that represent various static and/or dynamic aspects of the scene. Some of these models can be derived from digitized motion picture film using automatic image-interpretation techniques and then proceed to combine computer-generated abstract elements with the elements derived from image-interpretation in a visually and aesthetically pleasing way.

Problems can occur with this approach, however, since automatic image-interpretation processes are statistical in nature, and the input image pixels are themselves the results of a sampling and filtering process. Consider that images are sampled from two-dimensional (2-D) projections (onto a camera's imaging plane) of three-dimensional (3-D) physical scenes. Not only does this sampling process introduce errors, but also the projection into the 2-D image plane of the camera limits the amount of 3-D information that can be recovered from these images. The 3-D characteristics of objects in the scene, 3-D movement of objects, and 3-D camera movements can typically only be partially quantified from sequences of images provided by cameras.

As a result, image-interpretation processes do not always automatically converge to the correct solution. For example, even though one might think it is relatively straight forward to derive a 3-D mathematical representation of a simple object such as a soda can from sequences of images of that soda can, a process for determining the location and size of a 3-D wire frame mesh needed to represent the soda can may not properly converge, depending upon the lighting, camera angles, and so on used in the original image capture. Because of the probabilistic nature of this type of model, the end result cannot be reliably predicted.

SUMMARY OF THE INVENTION

The invention is a method for temporal smoothing of results from a scene analysis process, such as to create, in real time, a sequence of visually pleasing and acceptable images generated in whole or part from such results. The invention is also a method of combining temporal smoothing with spatial smoothing, thus further improving the images generated in whole or part from such results.

The temporal smoothing is applied across time-related sets of scene analysis results. Temporal smoothing can be done across these results in either a pixel-oriented or geometric domain, depending on the scene analysis technique being used. The spatial smoothing can be applied at one or more steps in the process: to images in the original sequence, to intermediate or final results of scene analysis in either a pixel-oriented or geometric domain, or to the images generated in whole or part from the scene analysis results.

In a preferred embodiment, different levels of smoothing are applied to different parts of the intermediate or final results. The differentiation can be done using image masks (for pixel-oriented results) or geometry selection techniques (for geometric results). This allows a higher level of smoothing in certain areas where the generated visual images will benefit from such additional smoothing, while avoiding over-smoothing in other areas where the smoothing would obscure critical details within the generated images.

The image masks or geometric selections can either be specified to apply uniformly over the time-based sequence of scene analysis results, or be specified to vary over time. Furthermore, the specification process can optionally be controlled by user mark-up and interactive parameter adjustment in a method such as the one described in the co-pending United States patent application by Madden, P. B., et. al, entitled "Computer Assisted Mark-up And Parameterization For Scene Analysis", filed Apr. 6, 1998, Ser. No. 09/056,022, and assigned to SynaPix, Inc., the assignee of the present application, which is hereby incorporated by reference.

The temporal smoothing method modifies or constrains the sequence of scene analysis results so that images generated from the results appear visually consistent from image to image. This is done through a combination of filtering and scaling adjustments applied these results. The filtering removes temporal "spikes"(abrupt variations in otherwise smoothly varying results), temporal "sparkles" (random variations in results) and temporal "ripples" (results that should have a constant slope when plotted against time, but instead vary around this slope). The scaling adjustments prevent temporal "jumps"(discontinuities) in scene analysis parameters that can only be estimated to within a scaling factor.

While the temporal smoothing method (with optional spatial smoothing) can be applied to results from a wide range of scene analysis techniques, it is particularly effective in smoothing time-oriented results from techniques for estimating three-dimensional parameters of a scene. This includes methods for estimating three-dimensional camera path and orientation in a scene, methods for estimating the depths of object surfaces in a scene, or methods for estimating the geometric structure of such surfaces.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference numerals refer to the same parts throughout the different views. The drawings are not necessarily to scale, emphasis instead being placed upon illustrating the principles of the invention.

FIGS. 7-1, 7-2, and 7-3 are a sequence of raw height estimates taken from depth map results plotted relative to a plane such as the table in the original image sequence.

FIGS. 8-1, 8-2, and 8-3 illustrate the height estimates after smoothing.

DETAILED DESCRIPTION OF THE INVENTION

1. Introduction

Figure 1:
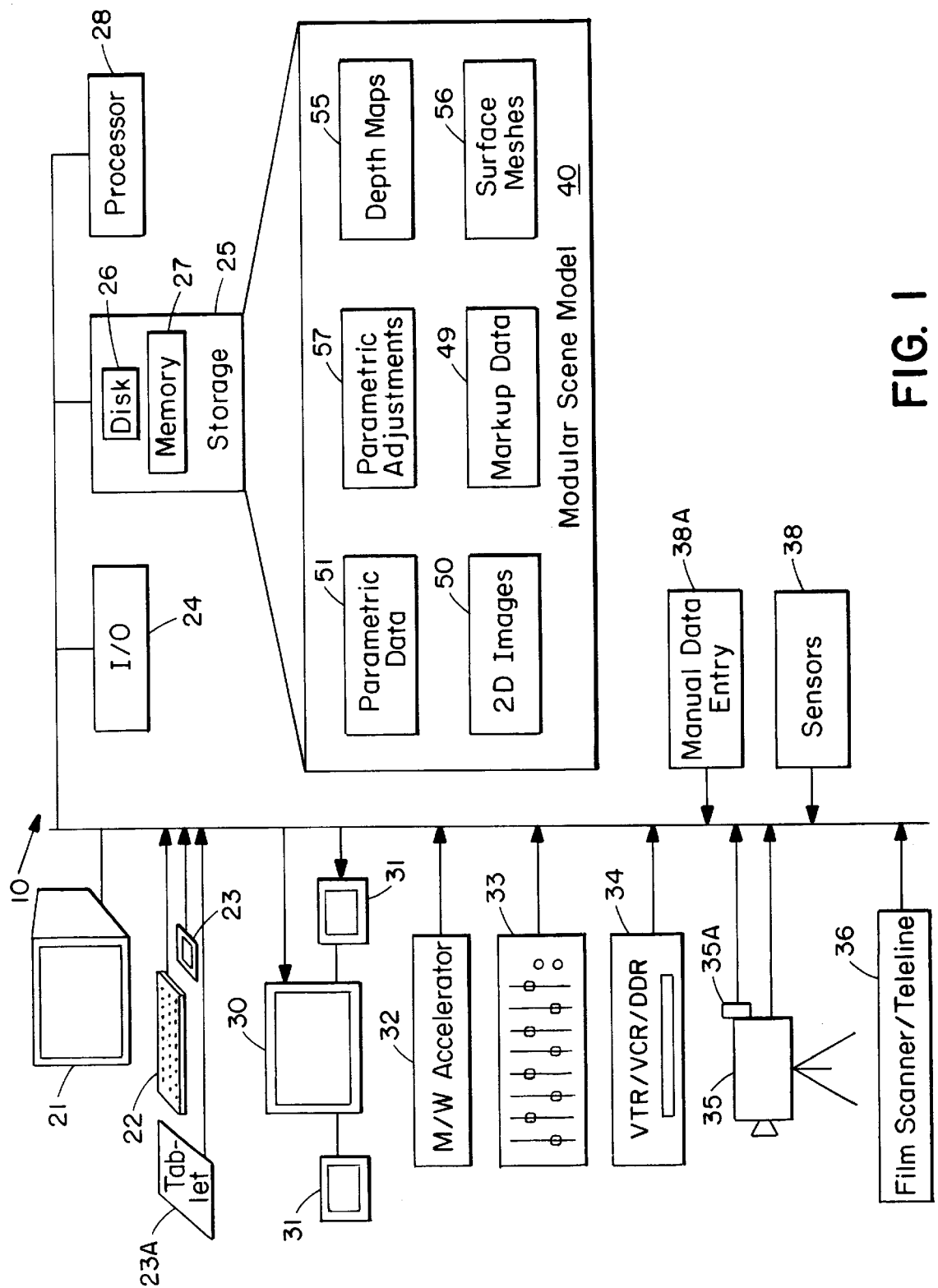
FIG. 1 is a block diagram of an image processing system which develops a scene model according to the inventions.

Turning attention now in particular to the drawings, FIG. 1 is a block diagram of the components of a digital image processing system 10 which applies temporal smoothing techniques according to the invention. The system 10 includes a computer workstation 20, a computer monitor 21, and input devices such as a keyboard 22, mouse 23 and tablet 23A. The workstation 20 also includes input/output interfaces 24, storage 25, such as a disk 26 and random access memory 27, as well as one or more processors 28. The workstation 20 may be a computer graphics workstation such as the 02/Octane sold by Silicon Graphics, Inc., a Windows NT type-work station, or other suitable computer or computers. The computer monitor 21, keyboard 22, mouse 23, tablet 23A, and other input devices are used to interact with various software elements of the system existing in the workstation 20 to cause programs to be run and data to be stored as described below.

The system 10 also includes a number of other hardware elements typical of an image processing system, such as a video monitor 30, audio monitors 31, hardware accelerator 32, and user input devices 33. Also included are image capture devices, such as a video cassette recorder (VCR), video tape recorder (VTR), and/or digital disk recorder 34 (DDR), cameras 35, and/or film scanner/telecine 36. Digitized camera parameters 35A may be captured to provide data and information concerning type, position, lens, focal length and other information about the cameras 35. Sensors 38 and manual data entry 38A may also provide information about the scene and image capture devices.

The present invention is intended for smoothing a continuous sequence of input images 39 at video playback rates. To accomplish this, software processes associated with the system 10 develop a modular scene model 40. This modular scene model 40 includes one or more of the original 2-D image sequence 50; captured parametric data and information 51; mark up data 49 related to the images 50; adjustments 47 to parametric data 51; depth maps 55 for the images 50; and surface meshes 56 for the images 50.

Figure 2:
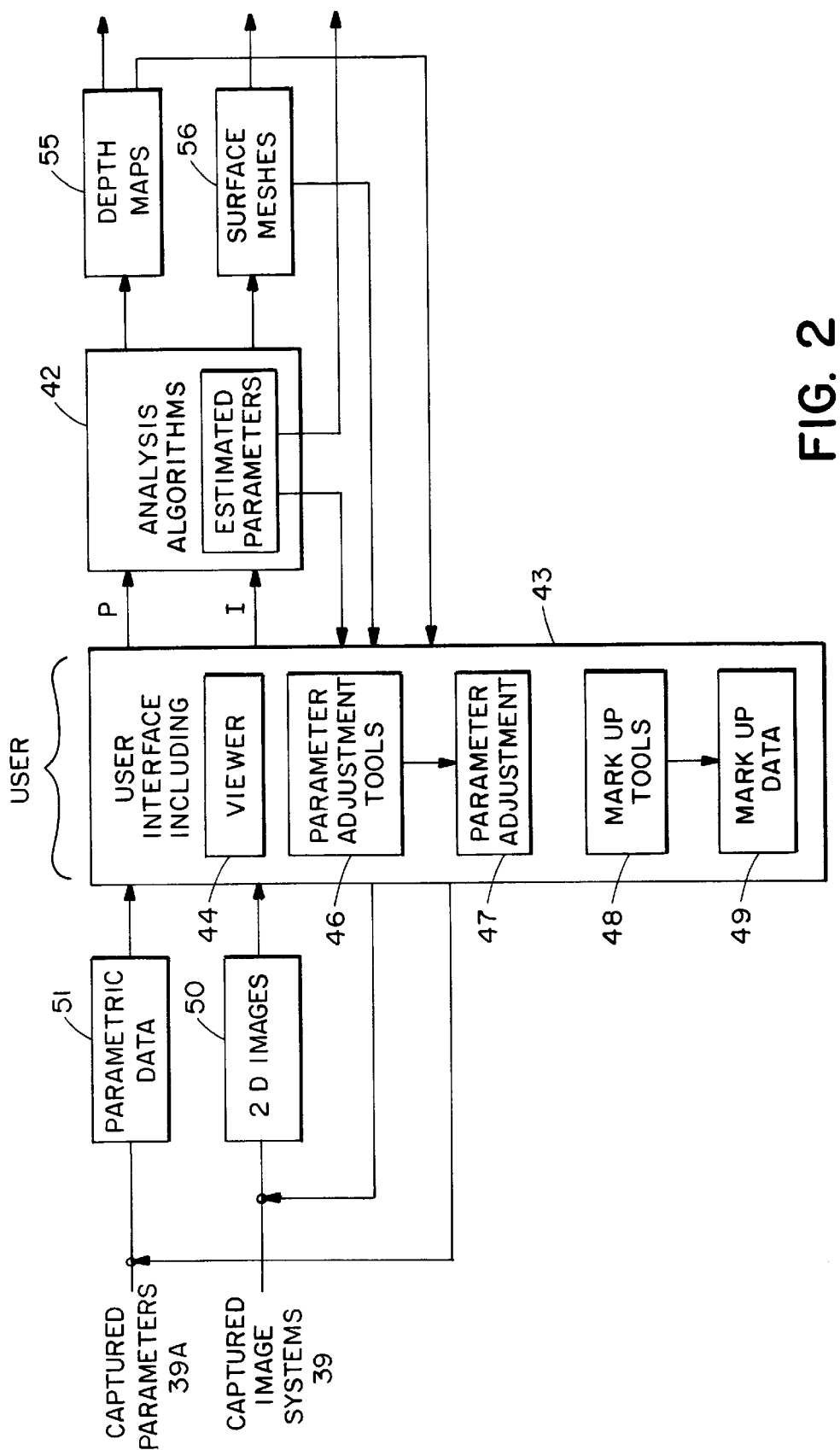
FIG. 2 is an illustration of various functional elements and data structures used in the scene model.

As shown in greater detail in FIG. 2, in a preferred embodiment, the modular scene model 40 is created and modified by software including an analysis function 42, parametric adjustment tools 46, and mark up tools 48. The analysis function 42 uses image processing algorithms, such as "machine vision" or "image understanding" algorithms as previously described, sometimes in conjunction with captured parametric data 39A, to extract and interpret information about the captured images 39.

This information extracted from the physical scene, as detected and/or estimated from the captured image(s), then become the basis for generating initial depth maps 55 and surface meshes 56 that characterize the scene. The initial depth maps 55 and surface meshes 56 may contain information not only derived from the captured image sources themselves, such as VTR/VCR/DDR 34 (camera 35 and film scanner/telecine 36) but also that derived from camera data capture 35A, manual data entry 38A and other secondary sensors 38. In addition, depth maps 55 and surface meshes 56 may be derived from synthetic image streams provided by external computer systems such as graphics systems and other computer modeling systems.

Further refinement of the depth maps 55 and surface meshes 56 may be achieved in a number of different ways. In a first scenario, the results of the initial pass of the image analysis function 42 are represented as depth maps 55 and/or surface meshes 56, presenting the user of the system 10 with a rendition of the scene via the scene viewer 44 for comparison to the original 2-D images 50. The user then provides inputs through the user interface 43 to refine the depth maps 55 and surface meshes 56. This can be done via the mark up tools 48 whereby the user provides information to the system identifying elements or regions in the image as being straight lines, planes, circles, and other geometric abstractions and/or pixel regions, such information being called mark up data 49. The analysis function 42 is performed again utilizing this additional mark up data 49 combined with the 2-D images 50 to produce a modified set of depth maps 55 and/or surface meshes 56 which are subsequently displayed in the scene viewer 44.

Continuing to pay attention briefly to FIG. 2, in the initial pass, analysis techniques 42 based strictly on the input image streams 39 can derive an initial modular scene model 40 containing depth maps 55 and/or surface meshes 56 that estimate the relative "depths" and positions of pixels or pixel regions in the original 2-D images. This process may typically also include estimating camera parameters 45 to provide depth estimates such as computed from image parallax and/or feature tracking between multiple images of the same scene, either successive images from the same camera, or images from two or more cameras. Data from other sensors such as laser range-finders, can also be used in depth estimation. Such estimates and additional data can be used in the analysis techniques 42 in combination with the mark up data 49 to produce further refinements of the depth maps 55 and/or surface meshes 56.

In a second scenario, the results of the initial pass of the image analysis function 42 are represented as depth maps 55 and/or surface meshes 56 and presented to the user via the scene viewer 44 as described earlier. The user then provides input in the form of parametric adjustments 47 performed within the parametric adjustment tools 46 portion of the user interface 43. Such inputs may include adjustments to the parameters such a focal length, the physical distance between two points in the scene, referred to as a "ground truth", camera position in time, camera shutter speed, and camera aperture settings for given frames of the captured image streams 39. Analysis function 42 is performed again utilizing this additional parametric information 47 combined with either original 2-D images 50 or in yet a third scenario with depth maps 55 and/or surface meshes 56 resulting from prior mark up tools 48 usage, to produce further refined depth maps 55 and/or surface meshes 56 which are subsequently displayed in the viewer 44.

In a third scenario, the user may elect to utilize the methods described above but with particular attention upon refining and improving camera parameter data as a combination of original parametric data 51 and parametric adjustments 47. In this scenario the estimated camera parameter data as part of 45 is adjusted by the user via the parametric adjustment tools 46. The analysis function 42 is performed again and the resultant depth maps 55 and surface meshes 56 are presented to the user through the viewer 44. Through a combination of visual inspection and quantitative system feedback the user can then iteratively adjust the camera parameter 45 values to produce a more acceptable result.

2. Temporal Smoothing of Scene Analysis Data in Image Sequence Generation

In accordance with the present invention, a time-based sequence of selected data from the scene analysis 42 process is first analyzed as a time-series. The data sets analyzed can represent inputs, such as the original image sequence 50 data; intermediate results, such as camera parameters 45, captured parametric data and information 51, mark up data 49 related to the images 50, or adjustments 47 to parametric data 51; or final results of the scene analysis 42, such as the depth maps 55 and/or surface meshes 56.

By representing the selected data as a time-series, corresponding data sets can then be compared across time-values. It is then possible to apply modifications of the data sets, and/or revised constraints on the scene analysis techniques, across the time-series. The modifications to the data sets are made with respect to their effect on a time-based image sequence 60 generated, in whole or in part, with the various results of scene analysis 42.

In addition, where the image sequence 60 generated by the scene viewer 44 is likely to display visually inconsistent or undesirable artifacts, appropriate filters or scaling factors are applied to modify the data and/or constrain portions of the associated scene analysis process 42. After these modifications are applied, the number of visually discernible artifacts perceptibly decreases in the generated image sequence 60, as will be illustrated later on.

The data sets used in this method, the time-series analysis performed, and the filtering and/or scaling factors applied depend on the specific scene analysis techniques and algorithms employed. The filtering or scaling factors also depend on the presence of optional pixel-oriented masks or geometry selections. These can selectively partition the scene analysis data or results, to apply a different filter or scaling to different parts of the data.

For example, to eliminate temporal "spikes" in the generated image sequence 60, standard curve-fitting techniques can be applied to a time series of corresponding data sets. A curve-fitting technique, with time as one axis, is an appropriate spike-removal technique for scene analysis results that normally vary smoothly over time. For example, camera path and orientation parameter 45 data typically have smoothly varying parameters and spikes in these paths are most likely to be anomalies. Individual results that do not lie on the curve, or within a specified tolerance factor (such as standard deviation) from the curve, are therefore constrained to fit on the curve. For fitting a time series of multi-dimensional data, surface-fitting techniques can be used.

Temporal "sparkles" are removed by applying a filtering technique, such as a box filter, Gaussian filter, or similar convolution filter, to each member of the selected time-series. Filtering each data set in the time-series reduces the number of random variations in the data sets, thus reducing the amount of sparkles perceived in a generated image sequence 60 resulting from this filtered data. This filtering can be applied at several different stages in the overall analysis 42 process.

Filtering the input image sequence 50 to the scene analysis 42 suppresses imaging artifacts, such as noise, in the original sequence of source images. However, by also filtering intermediate results within the analysis process 42, this smoothing is reflected in downstream steps of the process. For example, when a final result is inversely proportional to an intermediate result, then filtering out small temporal perturbation errors in the intermediate result prevents major temporal swings in the final result. Filtering for temporal sparkles can also be done on the final results of a scene analysis process 42, or even directly on the generated images 60.

Figure 4:
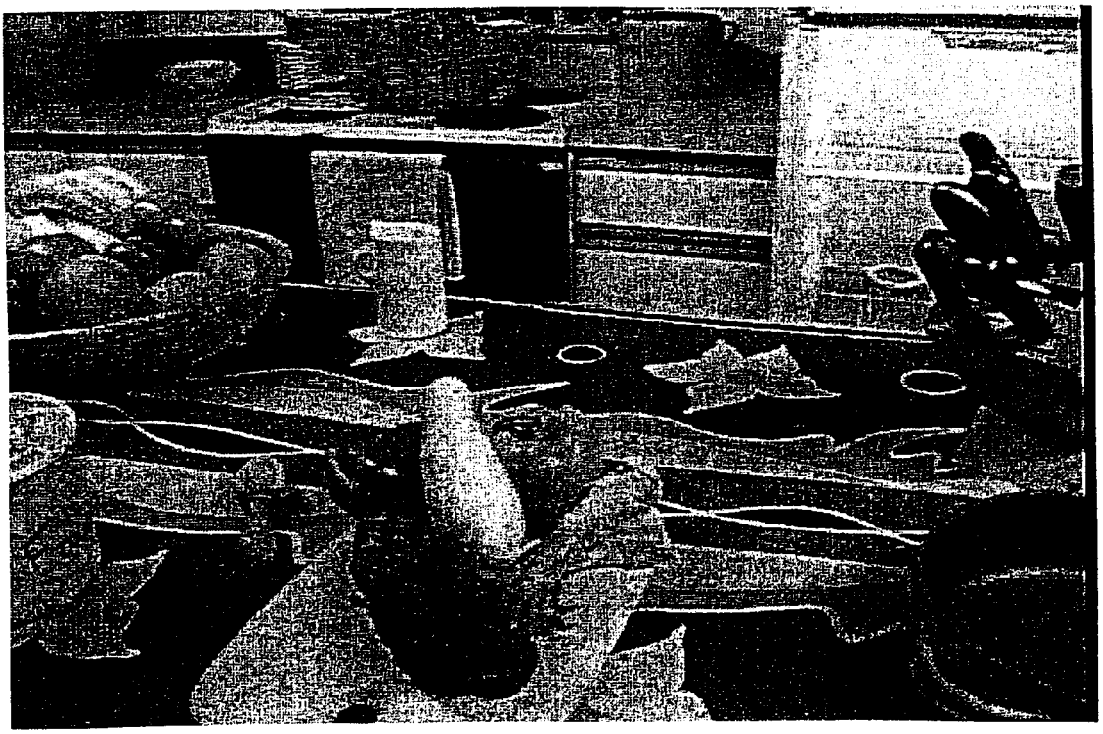
FIG. 4 is an original image of a kitchen scene.

Temporal "ripples" are controlled by filtering and curve-fitting (or surface-fitting) techniques. The temporal ripples reflect estimates that are varying around their true values. For example, a flat table in an image such as shown in FIG. 4 might be incorrectly estimated by the scene analysis 42 as a surface with bumps on it (possibly from visual artifacts like specular highlights on the table surface). At each time-value in a depth map 55 representing the table, the scene analysis 42 produces a different estimate of the table surface (and the bumps on the surface). When the generated sequence 60 is produced from this depth map 55, the bumps appear to undulate and move around the surface of the table.

Reducing such variations in each data set is a filtering problem, which can be addressed by any of the means described for temporal smoothing of sparkles. Further constraining the data sets to remove temporal ripples requires understanding the relationships between the data sets in the time series, however. In the table example, an estimate of how the table's surface moves over time would allow correlation of the data sets in the time-series. These correlated data sets can then be constrained by a curve-fitting or surface-fitting technique. The fitting process can either be done on each local data set, or fit across data sets using time as one of the coordinate axes in the curve-fitting algorithm.

Temporal "jumps" are smoothed by an aggregate function computed over each selected data set in the time-series. This can be a weighted or un-weighted aggregate function. Each selected data set must consist of data points with similar attributes that can be scalable as a group. For example, the estimated heights of object surfaces in a scene such as the table of FIG. 4 are scaled as a group and can be aggregated for each image or part of an image in a time-based sequence.

The aggregate values are compared across data sets in the time-series, and a scaling factor adjustment is derived for each data set which smooths the aggregate values. This scaling factor adjustment can be derived either from the average of the aggregate values, or from a curve-fitting process applied to the aggregate values over time. The scaling adjustment factors are then applied to their respective data sets.

3. Application to A Representative Scene Analysis Technique

Figure 3:
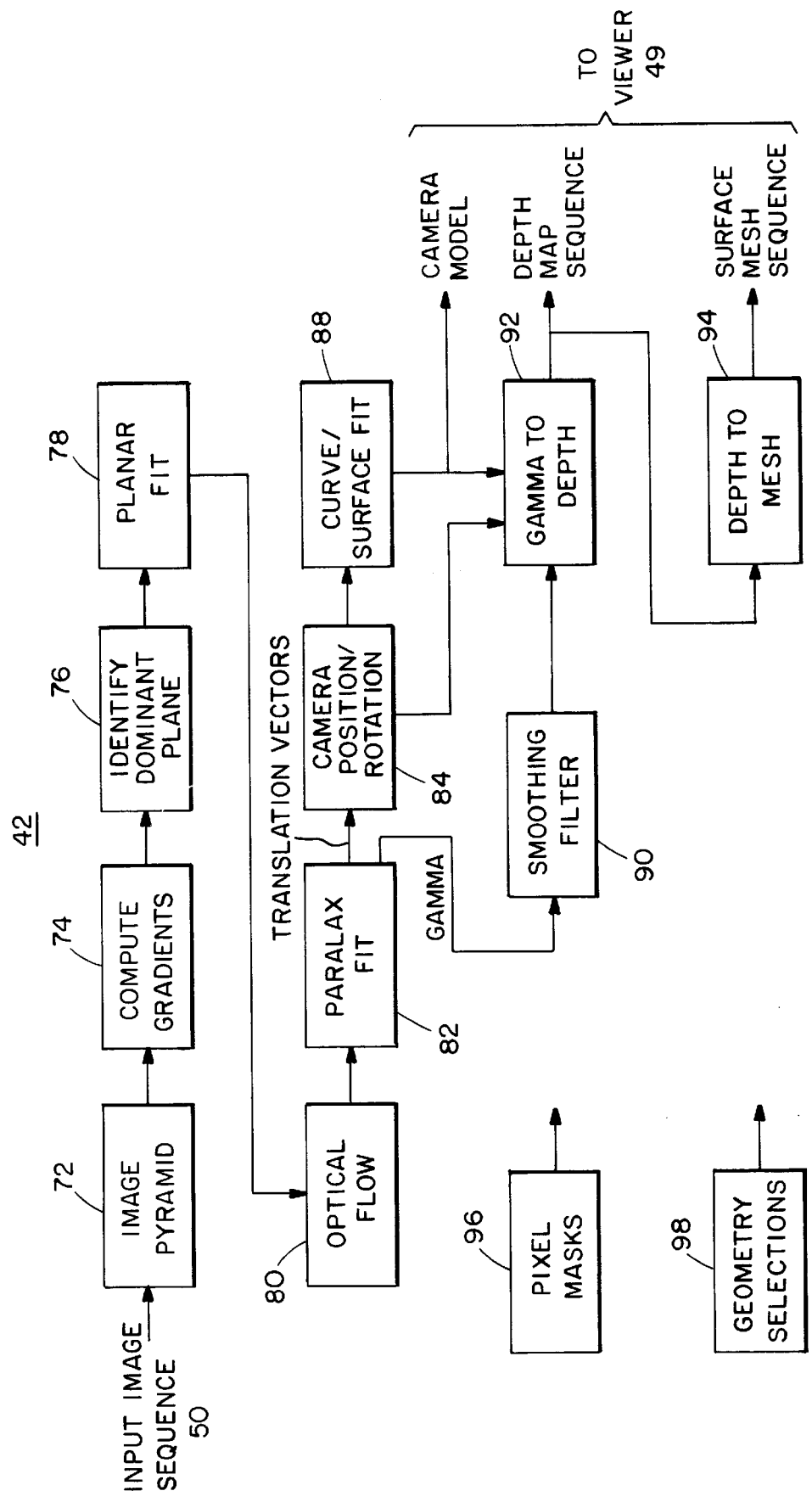
FIG. 3 is a flow diagram of an image analysis process in which temporal smoothing and/or filtering are applied according to the invention.

The application of the temporal smoothing method, with optional spatial smoothing, is now further described with respect to a representative scene analysis 42 technique. This technique derives a series of depth maps 55 and, optionally, surface meshes 56 from an input time-based image sequence 50. As shown in particular detail in FIG. 3, the scene analysis 42 technique includes process for developing an image pyramid 72, computing gradients 74, identifying dominant planes 76, planar fit 78, optical flow 80, parallax fit 82, camera position and rotation 84, curve and surface fit 88, sequence filter 90, and gamma to depth conversion 92. Optionally, a depth to mesh conversion 94, pixel masks 96, and geometry selections 98 may be employed.

The illustrated analysis function 42 follows a process which is known in general as a "planar parallax" method. First, the image pyramid process 72 develops an image pyramid wherein each image frame of the input image sequence 50 is represented as a hierarchical pyramid of successive frame representations at successively coarser levels of detail, e.g., as a fewer number of pixels. Gradient computation 74 is then applied to each pixel at each level of the pyramid. Dominant plane identification 76 then determines or estimates a dominant plane for each image in the sequence. For example, in a sequence of images such as shown in FIG. 4 of the kitchen, the dominant plane is typically the table.

A planar fit 78 process then calculates an optical flow field or vectors across each image pair, such, for example, using the image pyramid. The optical flow process 80 takes the resulting set of optical flow vectors which characterize the relative movement of objects and/or the camera in the scene, and then warps the second image of each image pair in the sequence using the optical flow field and subtracting it from the first image in each pair, to obtain the residual parallax.

The parallax fit process 82 then derives a "gamma" coefficient for each pixel in the first image of each pair and an estimated translation vector for the camera between images. The gamma coefficients are inversely proportional to the pixel depth from the camera.

Coefficients from both the planar fit 78 and parallax fit 82 are then used by the camera position and rotation estimation process 84, along with an estimated position of the dominant plane.

After applying filtering 90 to the sequence of gamma parameters provided by parallax fit, the estimated camera parameters (including available position, rotation and focal length parameters 45) and planar position are used to convert each pixel gamma into an estimated pixel depth from the camera, which then becomes the per-frame depth map 55. The camera parameters are preferably subjected to a curve fitting process 88 prior to application in the gamma-to-depth calculation.

An extension to this technique generates a per-frame geometric wireframe mesh of the estimated surfaces of objects in that image. This surface mesh 56 is generated from the depth map 55 and estimated camera parameters 45. Various combinations of the original images 50, estimated camera parameters 45, depth maps 55 and surface meshes 56 can be used to produce the generated image sequence 60 that incorporates the three-dimensional information from this scene analysis 42 technique.

Temporal smoothing according to the invention are thus applicable to multiple stages of the analysis process 42. For example, the per-pixel gammas are smoothed by the smoothing filter 90 before converting them to depth data. Since depth estimates are inversely proportional to gamma, relatively small frame-to-frame variations in gammas near zero can generate large temporal spikes in the associated depth data. Such gamma variations come from estimation errors or artifacts in the original images (such as specular highlights). By using the smoothing filter 90 to smooth the gammas in this manner, temporal sparkles and ripples are also reduced.

Camera path and camera rotation estimates are also temporally smoothed from image to image with the curve-fitting process 88. Smoothing camera paths and camera rotations can be done at the end of the analysis process 42, or as an intermediate result for use in the gamma to depth 92 calculation. For a sequence of input images 50 captured with a zooming camera, temporal smoothing through curve-fitting can be applied to the resulting time-series of focal length estimates. The sequence of estimated planar positions can be similarly smoothed.

The per-pixel depth estimates in the depth map 55 can themselves be filtered for each image. This can be done with or without filtering the gammas. Smoothing of per-pixel depth estimates in each image is intended to reduce both temporal sparkles and temporal ripples in images generated from these depth map 55 estimates.

Depth map 55 data is typically generated within a camera coordinate system, where the per-pixel depth values are estimating the distance from the camera in either polar or Cartesian coordinates. By using the estimated planar motion for the estimated or identified plane in the scene, these depth estimates 55 can also be converted using standard geometry transformations into estimated heights from the plane. (Note that these per-pixel depth estimates are self-consistent within each image, but are only within an arbitrary scale factor as compared to the depths in the actual scene.)

These estimated heights can then be aggregated, and their aggregate values used in a curve-fitting technique to achieve temporal smoothing of jumps in the scale factor. This temporal smoothing of the scale factor can then be applied to the depth estimates in each image, for generating an image sequence from this sequence of depth estimates that has fewer discernible temporal jumps in the scaling.

In the extension to this example process 42, depth map 55 data is converted into per-image geometric meshes 56. These surface meshes 56 can also be smoothed so that fewer temporal artifacts are visible when using a time-series of these surface meshes to generate an image sequence. Smoothing can be done during the conversion process by fitting splines, such as Non-Uniform Rational B-Splines (NURBS), to the estimated points in space rather than connecting these points into a polygonal mesh. Smoothing can also be done after conversion as a post-processing step.

An image sequence generated from a time-series of spline-based surface meshes 56 will generate fewer temporal anomalies than one based on a time-series of polygonal meshes. This is because polygonal meshes accentuate discontinuities in estimated surface geometry from mesh to mesh, whereas spline-based meshes smooth out these discontinuities.

In all cases in this example, different parts of the image (or geometry) can be selected and treated differently in the temporal smoothing process. This allows different levels of smoothing to be applied to different parts of the intermediate or final results. The differentiation can be specified through a separate process, or as part of the interactive parameter 46 and markup 48 processes that allow the user to control the inputs to scene analysis and temporal smoothing techniques within an interactive feedback loop. User markup data 49, may thus be used to specify areas of an input image sequence 50 to which different smoothing filters 90 or different curve fitting techniques 88 may be applied.

For example, the smoothing filter 90 may be relatively sharp if the particular concern is to correctly model areas of objects which are occluded. For other areas of the images 50, such for curved objects such as the soda can on the table in FIG. 4, the smoothing filter 90 parameters may be relaxed. Still other areas of an input image sequence 50 may be less important than others, and such areas can be removed from the smoothing.

If areas where casting shadows properly is of primary concern, sharper filters can be used than for areas in which softer relighting effects are desired.

Figure 5:
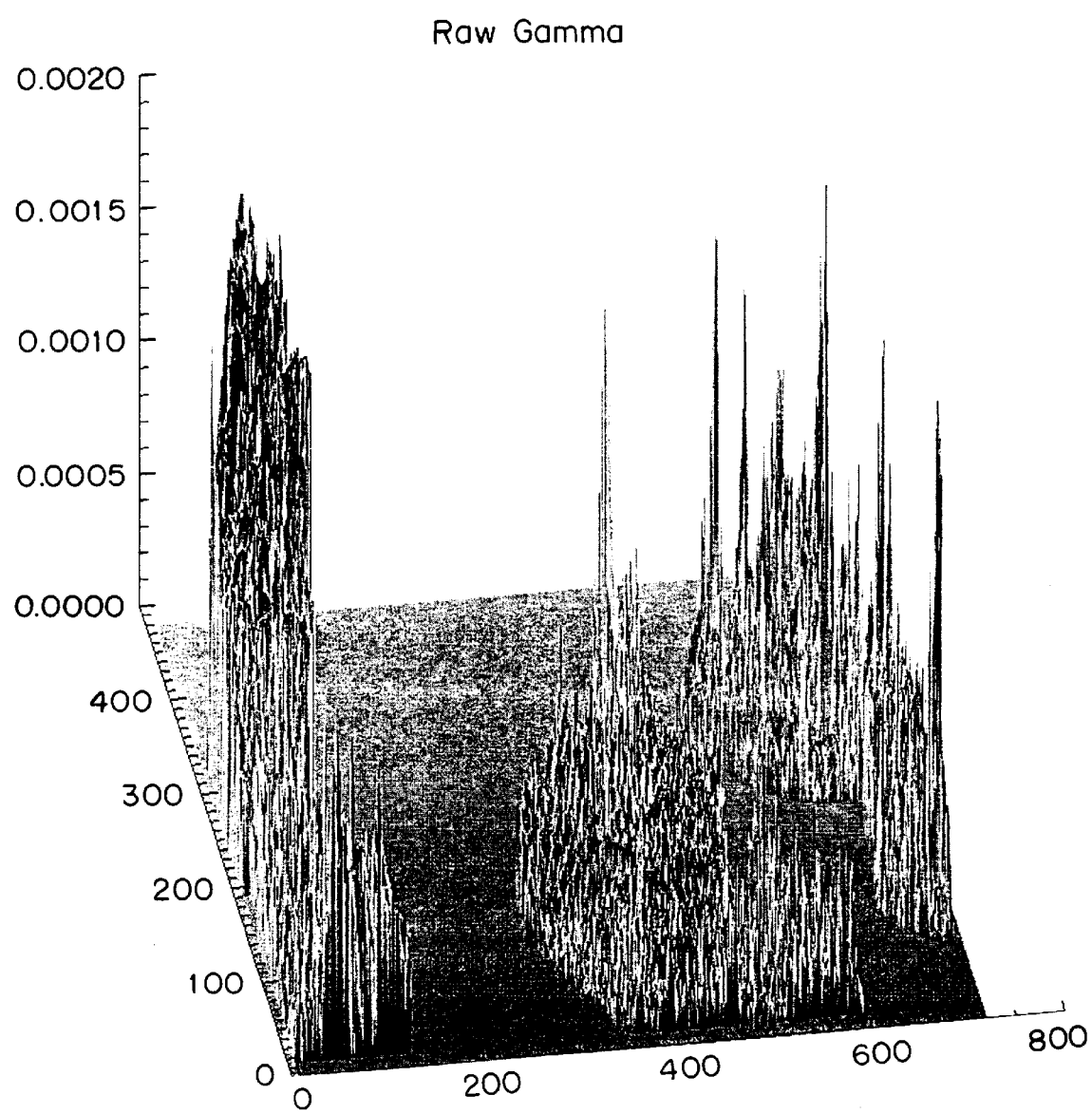
FIG. 5 is a 3-D plot of raw gamma values produced by an image analysis process for an image pair captured from the kitchen scene.
Figure 6:
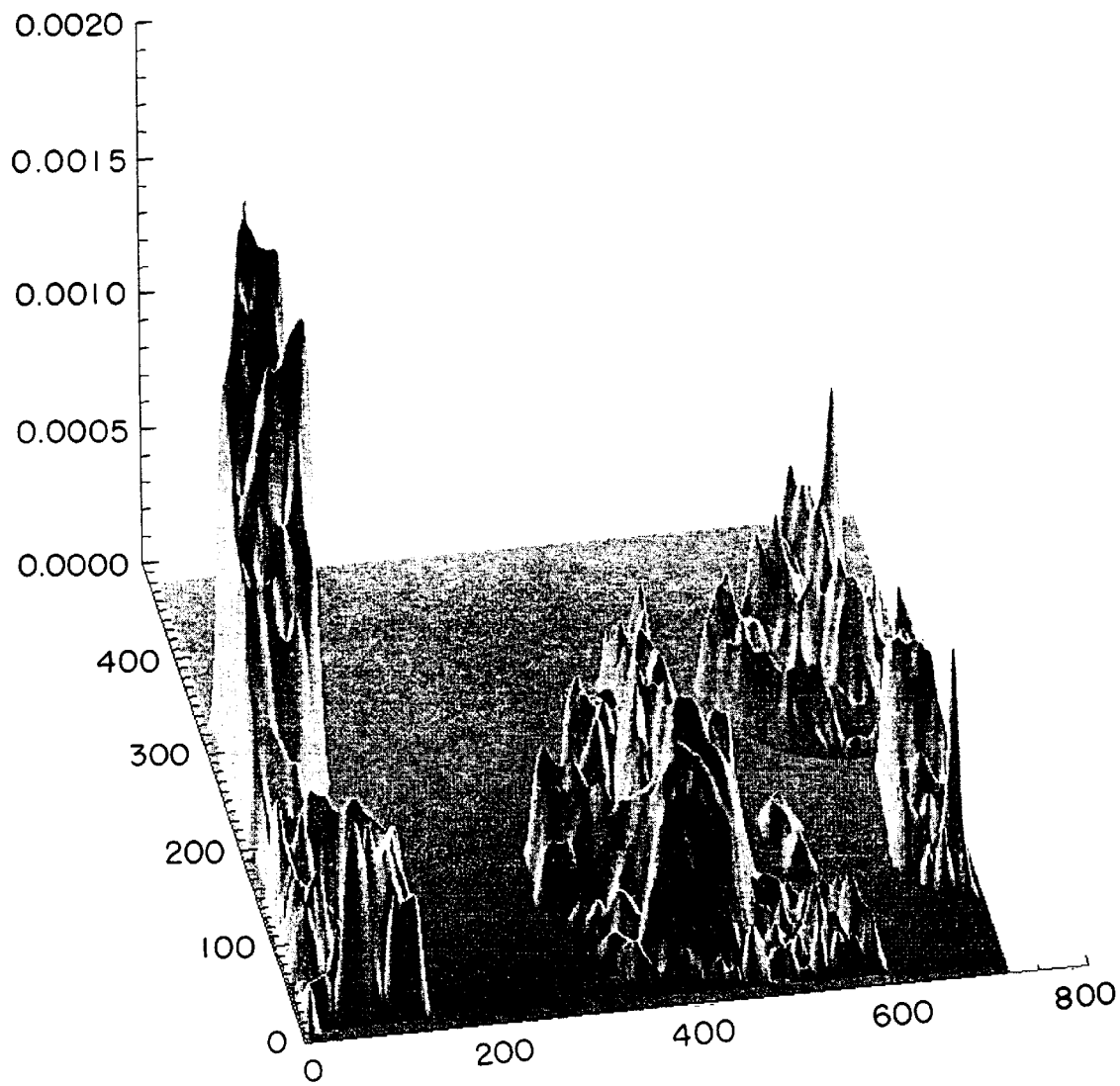
FIG. 6 illustrates gamma values after being smoothed according the invention.
Figures 1, 2, 3, 8:
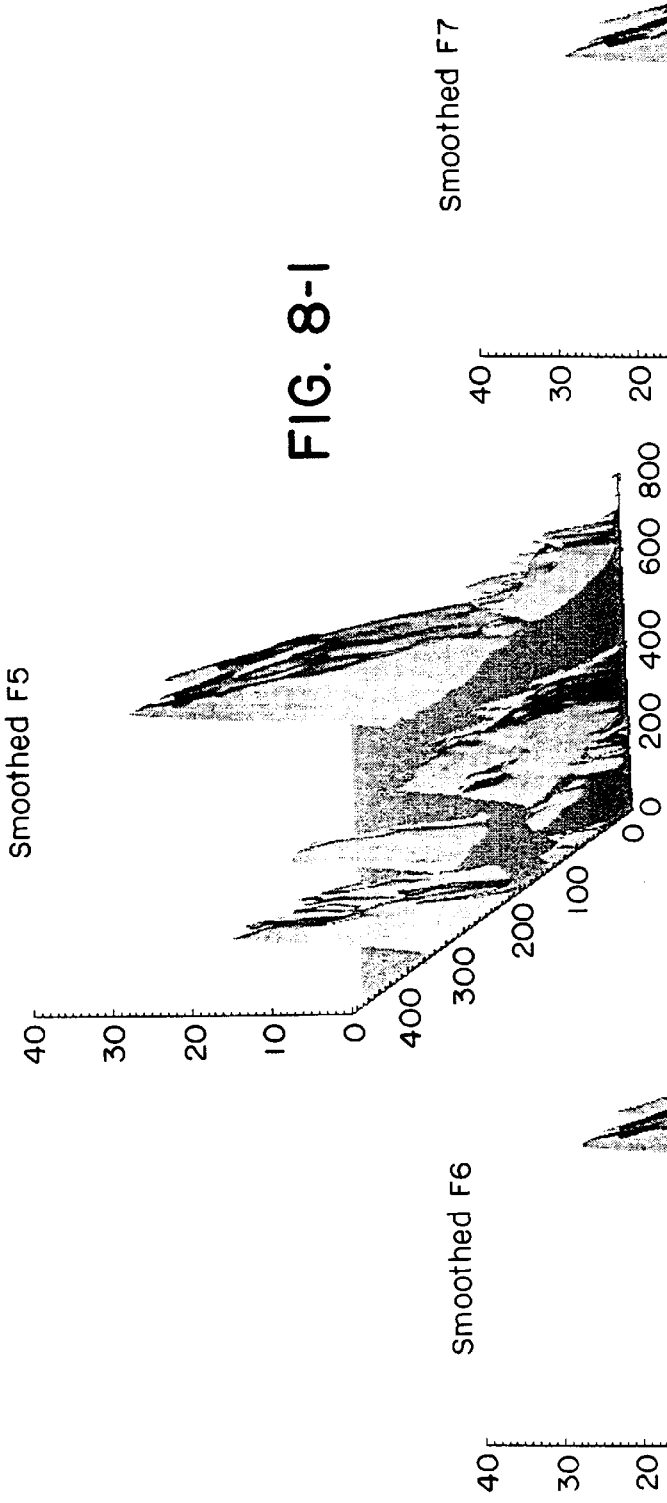

An appreciation for the improvements which may be accomplished by using the invention is evident from comparing FIGS. 5, 6, 7-1, 7-2, 7-3, and 8-1, 8-2, 8-3. FIG. 5 is a plot of the "raw" gamma values determined from an image pair selected from an input image sequence 50 captured from the kitchen shown in FIG. 4. FIG. 6 shows the results of applying the smoothing filter 90.

FIGS. 7-1, 7-2, and 7-3 represent a sequence of raw height estimates from the depth map 55 for the table and the object on the table. Not only do the estimates appear jagged, but more importantly, the estimates developed for the middle image of the sequence, shown in FIG. 7-2, are extremely erroneous. The result of viewing a generated image sequence 60 from this depth map is thus prone to exhibiting the aforementioned temporal jumps, sparkles and other anomalies.

FIGS. 8-1, 8-2 and 8-3 are the height estimates of the table and its objects after application of the smoothing filter 90, exhibiting far greater continuity in result. The filter 90 applied in this instance was a "box car" of 5×5 pixels applied to an image sequence at a D1 resolution of 720×486 pixels. The middle image of the sequence is now far more accurate, and the sequence when viewed no longer exhibits the undesirable anomalies.

The smoothed results across a range of images may also be used as a constraining process. For example, the "best" height estimate, that is, the height estimate for an image or a portion of an image exhibiting the least variance across a range of images can be used to constrain subsequent iterations of the scene analysis 42.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for processing a sequence of source images of a visual scene comprising the steps of:
   (a) analyzing the sequence of images to develop a data model of selected characteristics of the scene;
   (b) selecting at least two time-based series of data sets from the data model of selected characteristics provided by the scene analysis process;
   (c) comparing corresponding parametric values of a given time series with corresponding parametric values of another times series data sets, and
   (d) applying a smoothing filter and scaling adjustments to the parametric values to modify the data sets, to obtain visually pleasing results in a design visualization application.

2. A method as in claim 1 wherein the step of selecting a time-based series of data sets selects data from the original source image sequence.

3. A method as in claim 1 wherein the step of selecting a time-based series of data sets selects data from intermediate results of the scene analysis selected from the group consisting of camera parameters, captured parametric data, mark up data related to the images, or adjustments to parametric data.

4. A method as in claim 1 wherein the step of selecting a time-based series of data sets selects data from results of the scene analysis.

5. A method as in claim 4 wherein the results are a depth map.

6. A method as in claim 4 wherein the results are a surface mesh.

7. A method as in claim 1 wherein the step of selecting at least two time-based series of data sets additionally comprises calculating an optical flow field.

8. A method as in claim 7 additionally comprising obtaining a parallax fit.

9. A method as in claim 7 additionally comprising deriving a gamma coefficient.

10. A method as in claim 1 further comprising, prior to the step of applying a smoothing filter, deriving a gamma coefficient for each of a multiplicity of pixels, the gamma coefficients being inversely proportional to the pixel depth of the pixels.

11. A method as in claim 10 wherein the step of applying a smoothing filter includes applying the smoothing filter to the gamma coefficients.

12. A method as in claim 11 further comprising, after the step of applying a smoothing filter, converting each gamma coefficient to an estimated pixel depth.

13. A method as in claim 12 further comprising applying the smoothing filter to the estimated pixel depth.

14. A method as in claim 10 further comprising converting each gamma coefficient to an estimated pixel depth.

15. A method as in claim 14 wherein the step of applying a smoothing filter includes applying the smoothing filter to the estimated pixel depth.

16. A method for processing a sequence of source images of a visual scene comprising the steps of:
   (a) analyzing the sequence of images to develop a data model of selected characteristics of the scene;
   (b) selecting at least two time-based series of data sets from the data model of selected characteristics provided by the scene analysis process;
   (c) comparing corresponding parametric values of a given time series with corresponding parametric values of another times series data sets;
   (d) deriving a gamma coefficient for each of a multiplicity of pixels, the gamma coefficients being inversely proportional to the pixel depth of the pixels; and
   (e) modifying the parametric values and the gamma coefficients, to obtain visually pleasing results in a design visualization application.

17. A method as in claim 16, wherein the step of modifying includes applying a smoothing filter to the gamma coefficients.

18. A method as in claim 17, further comprising converting each gamma coefficient to an estimated pixel depth.

19. A method as in claim 18, further comprising applying the smoothing filter to the estimated pixel depth.

* * * * *